(12) United States Patent
LaCroix

(10) Patent No.: US 8,699,680 B2
(45) Date of Patent: Apr. 15, 2014

(54) UNSCREENED AUTOMATIC NUMBER IDENTIFICATION BASED ON BRANCH IDENTIFIER

(75) Inventor: Jeffrey Allyn LaCroix, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 13/299,377

(22) Filed: Nov. 18, 2011

(65) Prior Publication Data

US 2013/0129061 A1 May 23, 2013

(51) Int. Cl.
*H04M 15/00* (2006.01)
*H04M 7/00* (2006.01)

(52) U.S. Cl.
USPC .................. 379/115.01; 379/126; 379/225

(58) Field of Classification Search
USPC ............... 379/115.01, 118, 126, 127.01, 165, 379/225, 232
See application file for complete search history.

(56) References Cited

U.S. PATENT DOCUMENTS

| | | | | |
|---|---|---|---|---|
| 5,333,183 A * | 7/1994 | Herbert | ............... | 379/112.07 |
| 5,926,530 A * | 7/1999 | Schlossman et al. | ......... | 379/117 |
| 7,991,132 B2 * | 8/2011 | Yang | ................. | 379/115.01 |
| 2003/0068025 A1 * | 4/2003 | Wengrovitz et al. | ...... | 379/115.01 |
| 2006/0002534 A1 * | 1/2006 | Lang et al. | ................ | 379/126 |
| 2007/0071195 A1 * | 3/2007 | Aoki | ................... | 379/114.01 |

* cited by examiner

*Primary Examiner* — Quoc D Tran

(57) ABSTRACT

Methods, devices, and storage media provide for receiving a message pertaining to setting up a telephone call; inserting in the message a branch identifier that indicates a branch office of an enterprise from which the message originated; transmitting the message including the branch identifier to a private branch exchange device; and generating billing information for the telephone call based on the branch identifier.

22 Claims, 10 Drawing Sheets

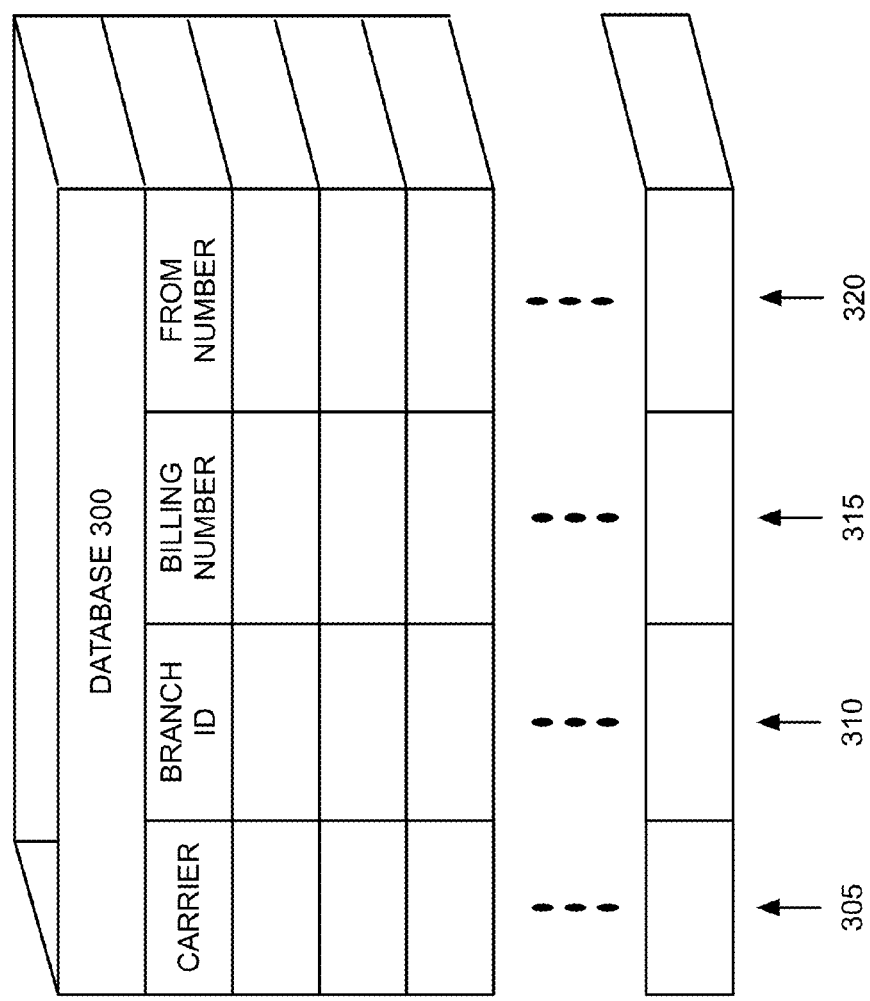

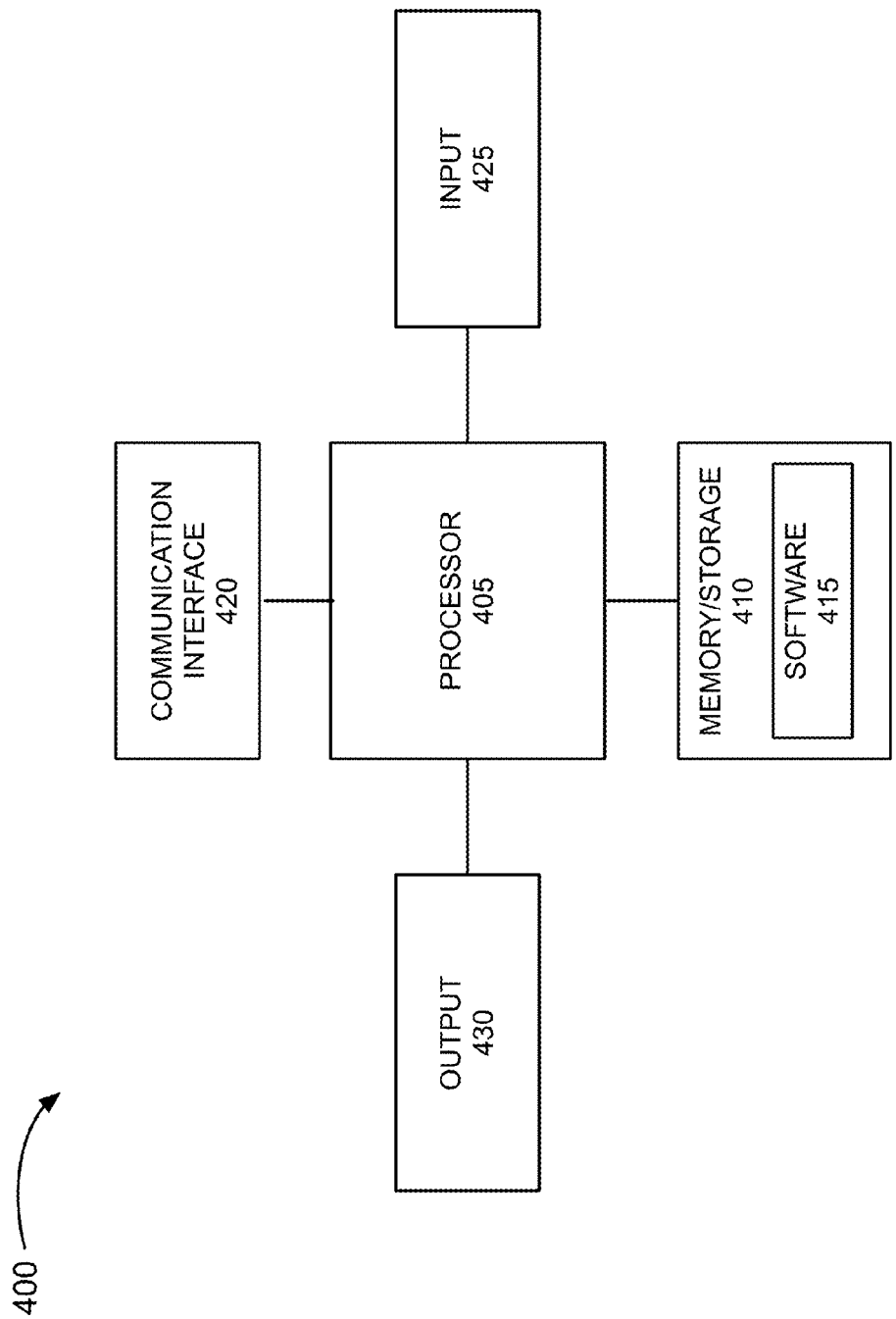

UNSCREENED AUTOMATIC NUMBER IDENTIFICATION BASED ON BRANCH IDENTIFIER

BACKGROUND

A company may use an enterprise network that includes an Internet Protocol Private Branch Exchange (IP PBX) to provide various services, such as telephony, messaging, presence, and video. The company may also use a trunking service, such as a Session Initiation Protocol (SIP) trunking service, to connect to a traditional phone system, such as a Public Switched Telephone Network (PSTN).

BRIEF DESCRIPTION OF THE DRAWINGS

FIG. 3A is a diagram illustrating an exemplary database;

FIG. 4 is a diagram illustrating exemplary components of a device that may correspond to one or more of the devices in the environment depicted in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Unscreened automatic number identification (ANI) permits customers to present any telephone number as an outbound caller identification. In an enterprise setting, in which there may be multiple branches and a main office through which all telephone calls are processed, it is difficult to identify from which branch a call originated. For example, the call may include only the extension number of the calling party.

According to an exemplary embodiment, a network device receives a call setup message and adds a branch identifier to the message. The branch identifier indicates a branch office (e.g., an enterprise site) from which the message originated. According to an exemplary implementation, a network device may be situated at each branch office so that each call from a branch office includes a branch identifier. According to an exemplary implementation, the network device may be implemented as a session border controller (SBC).

According to an exemplary implementation, the call setup message may be a Session Initiation Protocol (SIP) invite message. According to other implementations, the call setup message may be a message based on some other format and/or protocol (e.g., H.323, Extensible Markup Language Protocol (XMPP), Skinny Call Control Protocol (SCCP), Internet Protocol (IP), etc.). According to an exemplary embodiment, the call includes a Voice over Internet Protocol (VoIP) call.

According to an exemplary embodiment, a network device formats the message for unscreened automatic number identification service based on the branch identifier. For example, the network device may add a header and/or a field to the message based on requirements of the carrier to service the call. The network device may use the branch identifier as a basis to select a telephone number that is used for billing purposes for the call. For example, an agent may place a call from a branch office located in Boston to a customer also located in Boston. The call may be routed to a main office located in Chicago that processes calls from branch offices. In this example, the network device may use the branch identifier to select a telephone number (e.g. a main telephone number for the branch office located in Boston) as a telephone number to bill the call. In this way, the call will not be billed as a long-distance call, even though the call is traversing through the main office located in Chicago.

Figure 1:
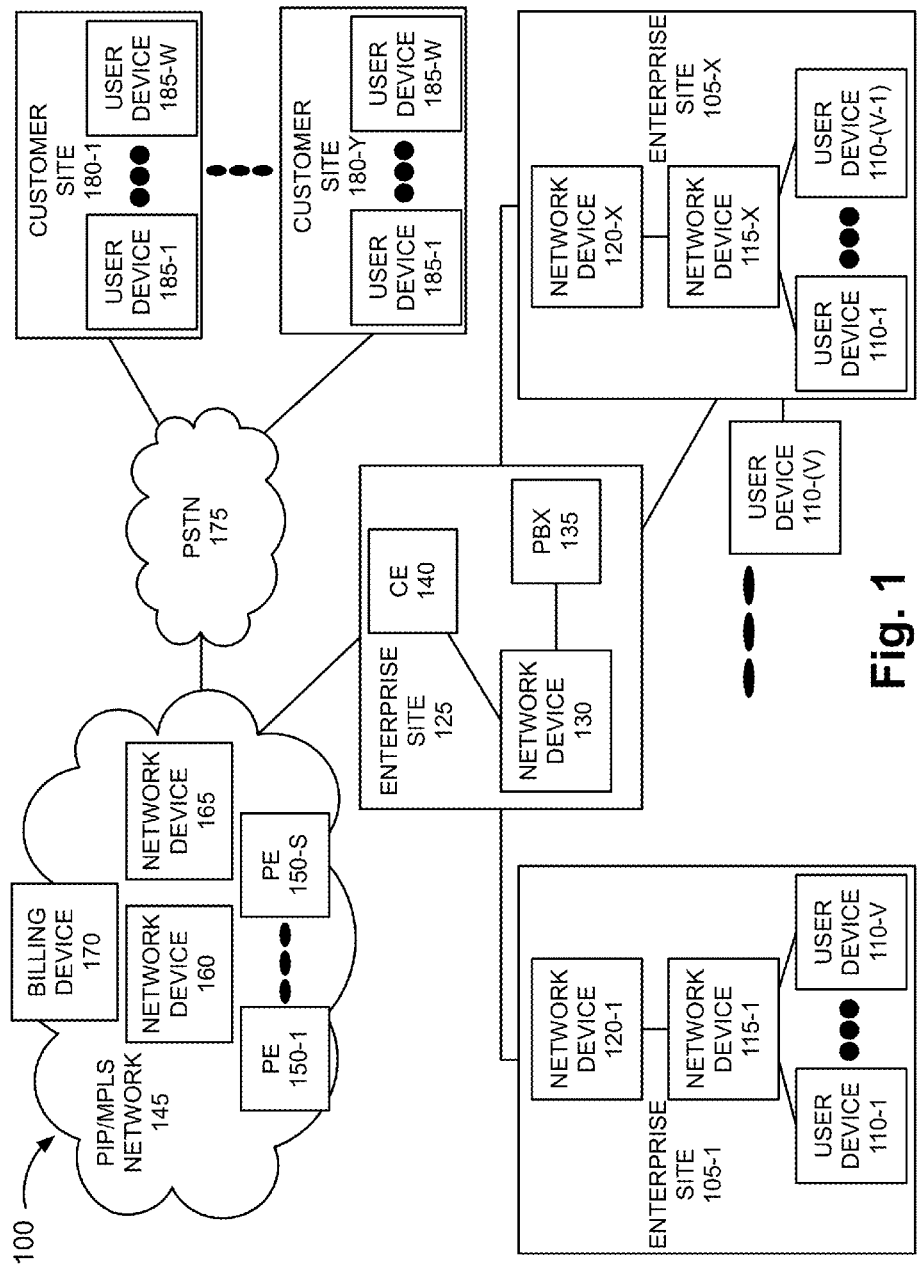
FIG. 1 is a diagram illustrating an exemplary environment in which an exemplary embodiment for providing unscreened automatic number identification based on branch identifiers may be implemented.

FIG. 1 is a diagram illustrating an exemplary environment in which an exemplary embodiment for providing unscreened automatic number identification based on branch identifiers may be implemented. As illustrated, environment 100 includes enterprise sites 105-1 through 105-X, in which X>1 (referred collectively as enterprise sites 105 or individually as enterprise site 105). Enterprise site 105 includes user devices 110-1 through 110-V, in which V>1 (referred collectively as user devices 110 or individually as user device 110), a network device 115, and a network device 120. As further illustrated, environment 100 includes an enterprise site 125 that includes a network device 130, a PBX 135, and a customer edge (CE) device 140. Environment 100 also includes a private IP/Multiprotocol Label Switching (PIP/MPLS) network 145 that includes provider edge (PE) devices 135-1 through 135-S, in which S>1 (referred to collectively as provider edge devices 135 or individually as provider edge device 135), a network device 160, a network device 165, and a billing device 170. Additionally, environment 100 includes a public switched telephone network 175, and customer sites 180-1 through 180-Y, in which Y>1 (referred to collectively as customer sites 180 or individually customer site 180) that each include user devices 185-1 through 185-W, in which W>1 (referred to collectively as user devices 185 or individually as user device 185).

The number of devices and the configuration in environment 100 are exemplary and provided for simplicity. According to other embodiments, environment 100 may include additional devices, fewer devices, different devices, and/or differently arranged devices, than those illustrated in FIG. 1. Additionally, the number and type of networks in environment 100 are exemplary and provided for simplicity.

According to other embodiments, a single device in FIG. 1 may be implemented as multiple devices and/or multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 may be implemented to include wired and/or wireless connections among the devices illustrated.

Enterprise site 105 is a location associated with a company or a business. User device 110 includes a telephone. For example, the telephone may be implemented as a PBX telephone. According to an exemplary implementation, a user may be able to access PBX 135, via user device 110, on-site (e.g., enterprise site 105). According to another exemplary implementation, a user may be able to access PBX 135, via user device 110, off-site.

Network device 115 includes a network device that connects enterprise site 105 to enterprise site 125. According to an exemplary implementation, network device 115 includes a gateway device. Network device 120 includes a network device that inserts a branch identifier in a call message. According to an exemplary implementation, network device 120 includes a session border controller.

Enterprise site 125 is a location associated with a company or a business. Network device 130 includes a network device that manages signaling and calls. According to an exemplary implementation, network device 130 includes a session border controller. PBX 135 includes a device that provides telephone switching services. According to an exemplary implementation, PBX 135 includes an IP PBX. PBX 135 may serve as a common access point for calls. CE device 140 includes a network device that connects enterprise site 125 to PIP/MPLS network 145. According to an exemplary implementation, CE device 125 includes a customer edge router.

PIP/MPLS network 145 includes a PIP/MPLS network. PE device 150 includes a network device that connects PIP/MPLS network 145 to enterprise site 125. According to an exemplary implementation, PE device 135 includes a provider edge router.

Network device 160 includes a network device that provides a trunking service. For example, network device 160 may provide a SIP trunking service, an H.323 trunking service, etc. According to an exemplary implementation, network device 160 includes a network device having a communications management system (e.g., a call manager, such as Avaya™, etc.).

Network device 165 includes a network device that connects PIP/MPLS network 130 to PSTN 175. According to an exemplary implementation, network device 165 includes a gateway device. Billing device 170 includes a network device that collects and processes billing information.

PSTN 175 includes a voice or a telephone network. According to an exemplary implementation, PSTN 150 includes a traditional public circuit-switched telephone network. Customer site 180 is a location associated with a user of user device 185. User device 185 includes a telephone or other type of telephony device (e.g., a mobile device, etc.).

Figure 2A:
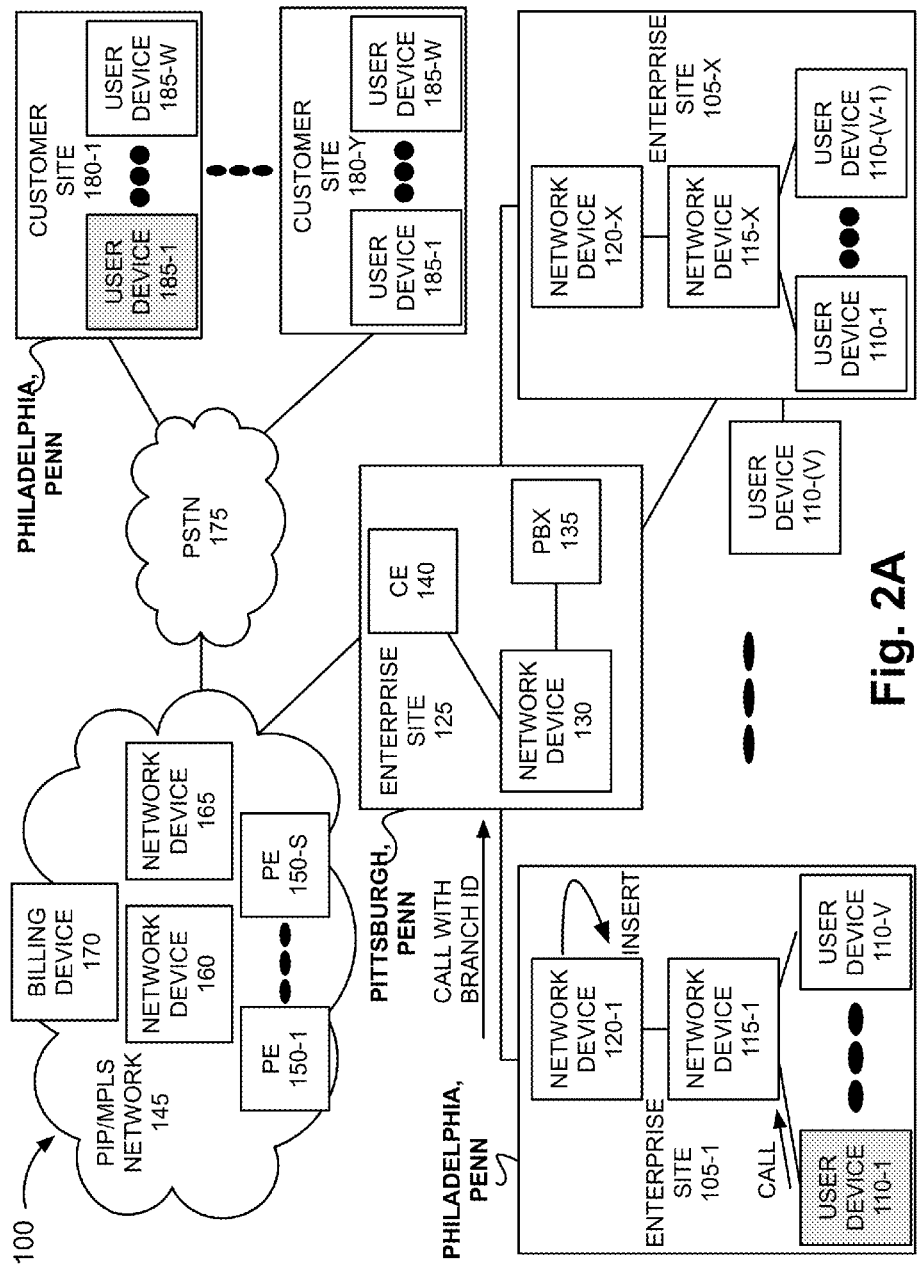
FIGS. 2A-2D are diagrams illustrating an exemplary scenario in which unscreened automatic number identification based on a branch identifier may be provided in the environment depicted in FIG. 1.

FIGS. 2A-2D are diagrams illustrating an exemplary scenario in which unscreened automatic number identification based on a branch identifier may be provided in the environment depicted in FIG. 1. Referring to FIG. 2A, assume that a user of user device 110-1 in enterprise site 105-1 places a telephone call to a user of user device 185-1 in customer site 180-1. In this example, assume that enterprise 105-1 is located in Philadelphia, Pa., enterprise site 125 is located in Pittsburgh, Pa. and customer site 180-1 is located Philadelphia, Pa. Also, assume that the user of user device 110-1 is calling from extension 25115 and that the user of user device 185-1 has a telephone number of 215-202-1515.

As illustrated, a call message is transmitted from user device 110-1. For example, the call message may be a call connect message for setting up a call between the user of user device 110-1 and the user of user device 185-1. The call connect message includes the calling number (e.g., 25115) and the called number (e.g., 215-202-1515). According to another implementation, the calling number may include a 10 digit telephone number, which may not be a publically known telephone number (i.e., not known outside of the enterprise network).

According to an exemplary implementation, if the call connect message is not in a format for PIP/MPLS network 145 and/or enterprise site 125, network device 115 may convert the call connect message (e.g., a touch-tone message) to an IP-based message (e.g., a SIP invite message or other suitable format). According to another exemplary implementation, network device 115 may not convert the call connect message. For example, PBX 135 of enterprise site 125 may convert the call connect message or some other network device in the calling path may convert the call connect message, if necessary. In this example, assume that network device 115-1 converts the call message to a SIP invite message and the SIP invite message is transmitted to network device 120-1.

According to another embodiment, network device 120-1 inserts a branch identifier in the call message. According to this exemplary scenario, network device 120-1 inserts a branch identifier in the SIP invite message. The branch identifier identifies the branch (e.g., enterprise site 105-1) from which the call originated. According to an exemplary implementation, the branch identifier includes a string of one or more characters. For example, the string may be an alphabetic string, a numeric string, an alphanumeric string, or some other type of identifier. As an example, the branch identifier may be implemented as a branch main telephone number.

Network device 120-1 may insert the branch identifier in various fields or portions of the call message. For example, according to an exemplary implementation, network device 120-1 may insert the branch identifier in a user-to-user information (UUI) header. According to other implementations, network device 120-1 may insert the branch identifier as a SIP uniform resource identifier (URI) parameter, an Extensible Markup Language (XML) tag (e.g., using the Session Description Protocol (SDP), or other suitable data/information carrier. In this example, it may be assumed that network device 120-1 adds a branch identifier of "21" to the call message. As illustrated, network device 120-1 transmits the call message, which includes the branch identifier, to enterprise site 125.

Figure 2B:
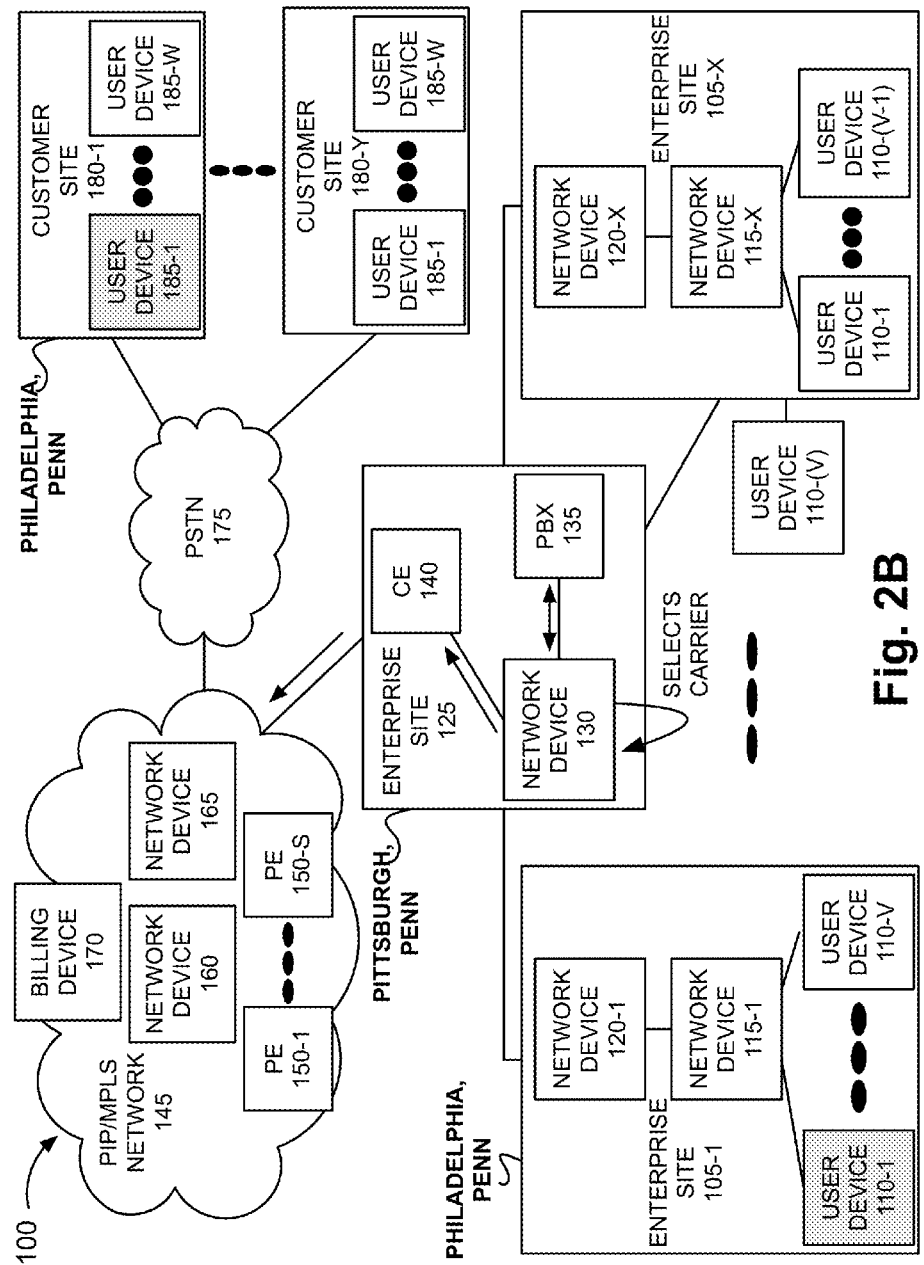

Referring to FIG. 2B, PBX 135 receives, via network device 130, the call message that includes the branch identifier. PBX 135 determines that the call is outbound to the user of user device 185-1 based on, for example, a "To" SIP header. PBX 135 routes the call message to network device 130.

Network device 130 identifies the presence of the branch identifier in the call message and determines the format of the call message to satisfy unscreened automatic number identification requirements. For example, in a multi-carrier implementation, network device 130 may select the carrier to use to service the call based on load-balancing requirements. Based on the carrier to service the call, network device 130 prepares the call message. For example, a carrier may use a diversion header to provide unscreened automatic number identification services. Thus, if the call message does not already include a diversion header, network device 130 may generate and add the diversion header to the call message. Alternatively, for example, a different carrier may use a history header to provide unscreened automatic number identification services. Thus, if the call message does not already include a history header, network device 130 may generate and add the history header to the call message. According to an exemplary implementation, network device 130 may receive the call message that already includes an appropriate header (e.g., a diversion header, a history header, a PAI header, etc.) or other type of data/information field, but the appropriate header or field does not include suitable information to satisfy unscreened automatic number identification requirements of a selected carrier.

According to other implementations, network device 130 may determine the format of the call message based on considerations other than load-balancing requirements. By way of example, network device 130 may determine the format of the call message based on monetary cost. As an example, network device 130 may format the call message toward the lowest cost carrier for a specific type of call. According to yet other implementations, in which a single-carrier implementation is used, network device 130 formats the message according to the carrier's requirements for providing unscreened automatic number identification services.

According to this exemplary scenario, it may be assumed that the call connect message (e.g., the SIP invite message) does not include the appropriate header. In this example, it may be assumed that the carrier uses a diversion header. Network device 130 generates and adds a diversion header to the call connect message. Network device 130 also selects a telephone number to be carried in the diversion header. According to an exemplary implementation, network device 130 accesses a database to select a telephone number for the diversion header. An exemplary database is described further below.

Figure 3B:
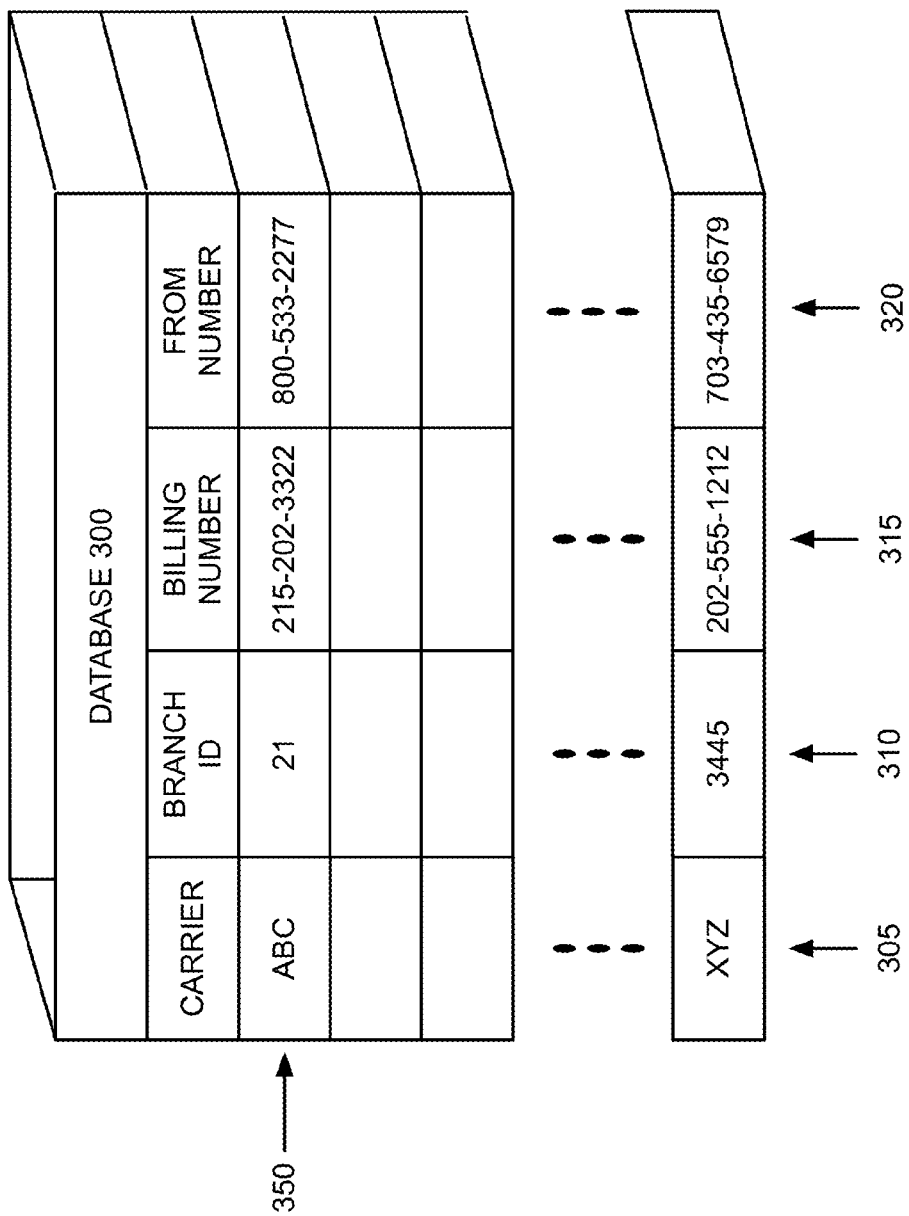
FIG. 3B is a diagram illustrating exemplary data in the database according to the exemplary scenario depicted in FIGS. 2A-2D.

FIG. 3A is a diagram illustrating an exemplary database 300. As illustrated, database 300 includes a carrier field 305, a branch identifier field 310, a billing number field 315, and a from number field 320.

Carrier field 305 indicates a carrier. For example, carrier field 305 may include an identifier associated with a carrier (e.g., Verizon™, AT&T™, etc.). Branch identifier field 310 indicates a branch identifier. For example, branch identifier field 310 may include a string corresponding to a branch identifier, as previously described. Billing number field 315 indicates a telephone number. According to an exemplary implementation, billing number field 315 may include a telephone number to which a call is billed. For example, billing number field 315 may include a main telephone number associated with a branch office (e.g., enterprise site 105) pertaining to the branch identifier. From number field 320 indicates a telephone number. For example, from number field 320 may include a vanity telephone number or other suitable telephone number, which may be known by, for example, PSTN 175. From number field 320 may include a telephone number that may be used as the "From" telephone number, the calling party number, or the like.

According to other implementations, database 300 may include additional, fewer, and/or different data and/or information fields. For example, according to an exemplary implementation, database 300 may include a field that indicates the format of a call message. For example, the field may indicate that a diversion header or a history header is used (e.g., for the corresponding carrier indicated in carrier field 305). Network device 130 may generate and add the appropriate field or header to a call message based on the information included in the field. Additionally, or alternatively, database 300 may be implemented using multiple databases.

Referring back to FIG. 2B, according to an exemplary implementation, network device 130 selects a carrier based on load balancing considerations. In this example, network device 130 selects a carrier called "ABC." Network device 130 adds a diversion header to the call message and uses database 300 to select a telephone number for the diversion header. For example, in FIG. 3B, network device 130 uses the branch identifier (e.g., "21") included in the call message to compare to branch identifier fields 310. In this example, network device 130 identifies record 350. Network device 130 selects the telephone number (e.g., 215-202-3322) included in billing number field 315 of record 350 to insert in the added diversion header. Additionally, according to an exemplary implementation, network device 130 replaces the extension number (e.g., 25115) included in a "Fr" field with a telephone number (e.g., 800-533-2277) included in from field 320 of record 350. Network device 130 transmits the call message to PIP/MPLS network 145 (e.g., network device 160) via customer edge device 140. According to other implementations, network device 130 may not use a database (e.g., database 300). Rather, network device 130 may include logic to convert branch identifiers to, for example, diversion headers, select telephone numbers, etc.

Figure 2C:
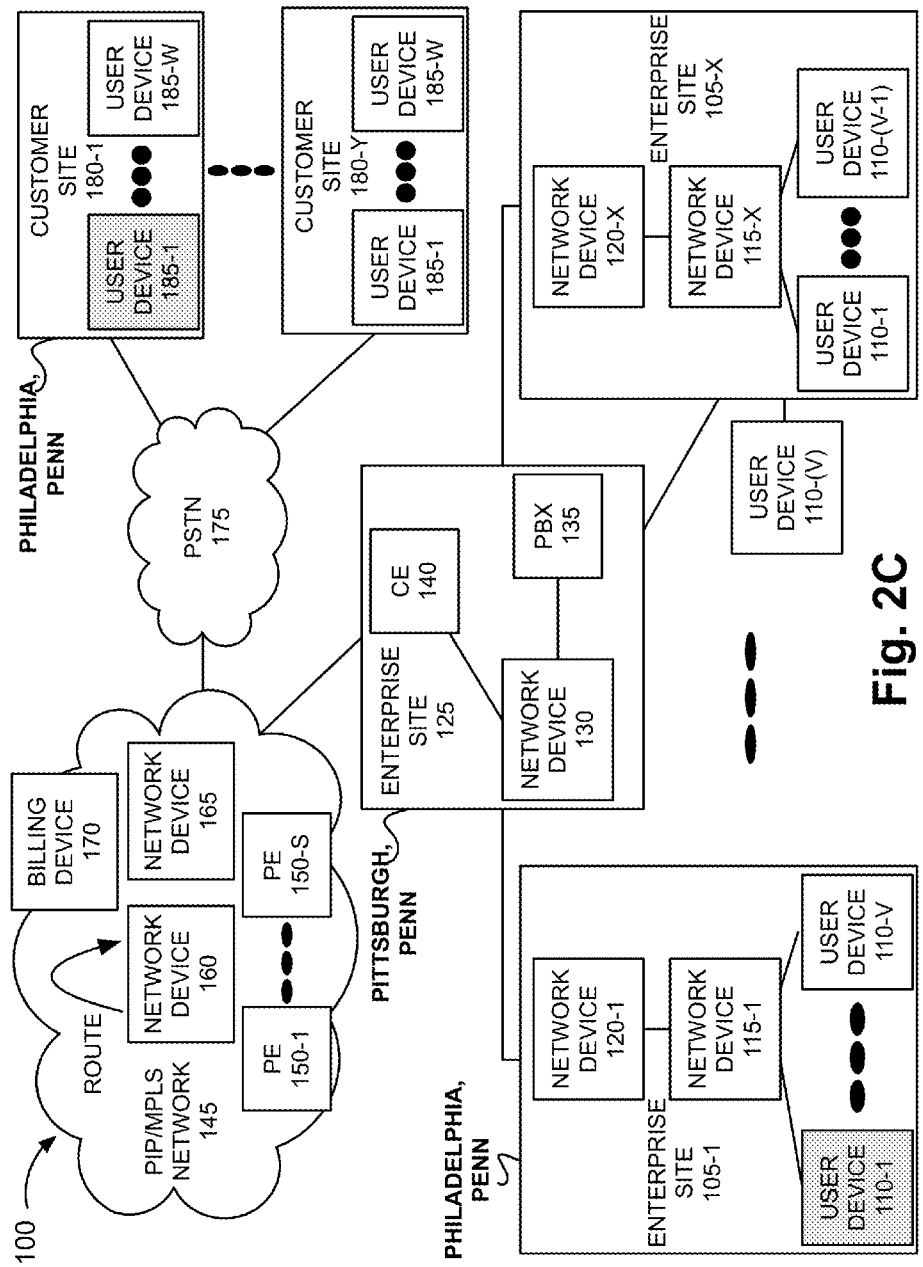

Referring to FIG. 2C, the call message is received by a provider edge device 150 and transmitted to network device 160. Network device 160 selects a route pattern and a trunk group based on, for example, the "To" field or the called party number included in the call message. Network device 160 transmits the call message to network device 165. Network device 165 may convert the call message to a PSTN compatible format. For example, network device 165 may generate and send a Signaling System #7 (SS7) ISDN user part (ISUP) initial address message (IAM) to PSTN 175. The calling number and the called number are included in the ISUP initial address message. A switch (not illustrated) in PSTN 175 replies with an ISUP address complete message to network device 165 and a voice path is established between the user of user device 110-1 and the user of user device 185-1.

Figure 2D:
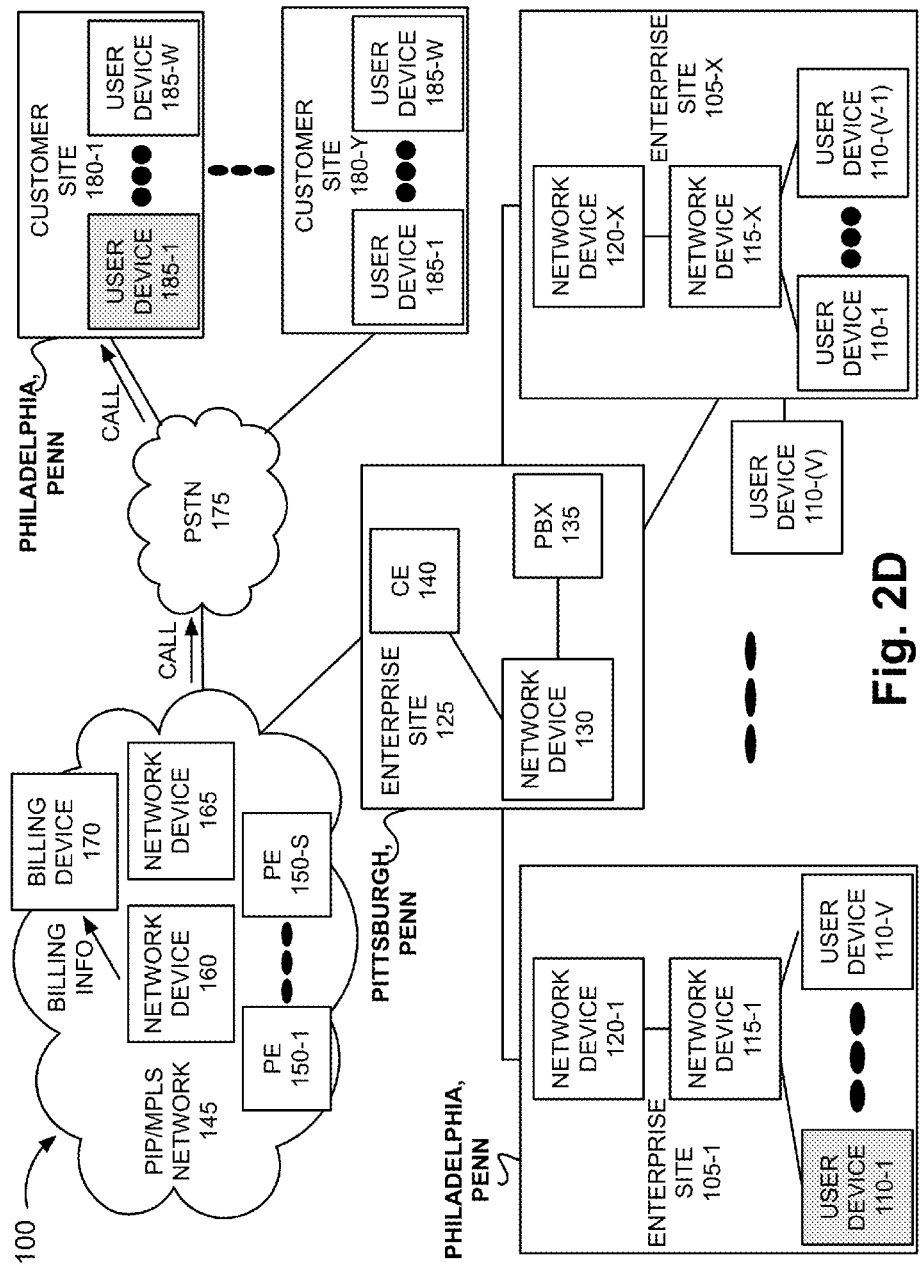

As illustrated in FIG. 2D, network device 160 provides billing information to billing device 170. For example, network device 160 may provide the telephone number included in the diversion header. In this way, the enterprise will be charged for the call as if the call is a local call versus a long distance call. That is, the billing of the call is based on "215-202-3322" even though the call traversed through Pittsburgh, Pa. Additionally, assuming the user of user device 185-1 subscribes to a caller ID service, the user of user device 185-1 see "800-533-2277" as the calling party number.

According to other examples, enterprise site 105-1 may be of a different area code, a different area code and a different prefix, etc., as the called number. As an example, referring to FIG. 2A, assume enterprise site 105-1 is located in Boston, enterprise site 125 is located in Chicago, and customer site 180-1 is located in Los Angeles. According to such a scenario, processes similar to that previously described may be performed. However, the call would not be billed as a local call. Rather, for example, the call would be billed as a long distance call based on the telephone number included in the diversion header.

FIG. 4 is a diagram illustrating exemplary components of a device 400 that may correspond to one or more of the devices in environment 100. As illustrated, according to an exemplary embodiment, device 400 includes a processor 405, memory/storage 410 storing software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. Communication interface 420 permits device 400 to communicate with other devices, networks, and/or systems. Communication interface 420 may include a wireless interface and/or a wired interface. Communication interface 420 includes a transmitter, a receiver, and/or a transceiver. Communication interface 420 may operate according to one or multiple protocols, standards, and/or the like.

Input 425 provides an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 provides an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5A:
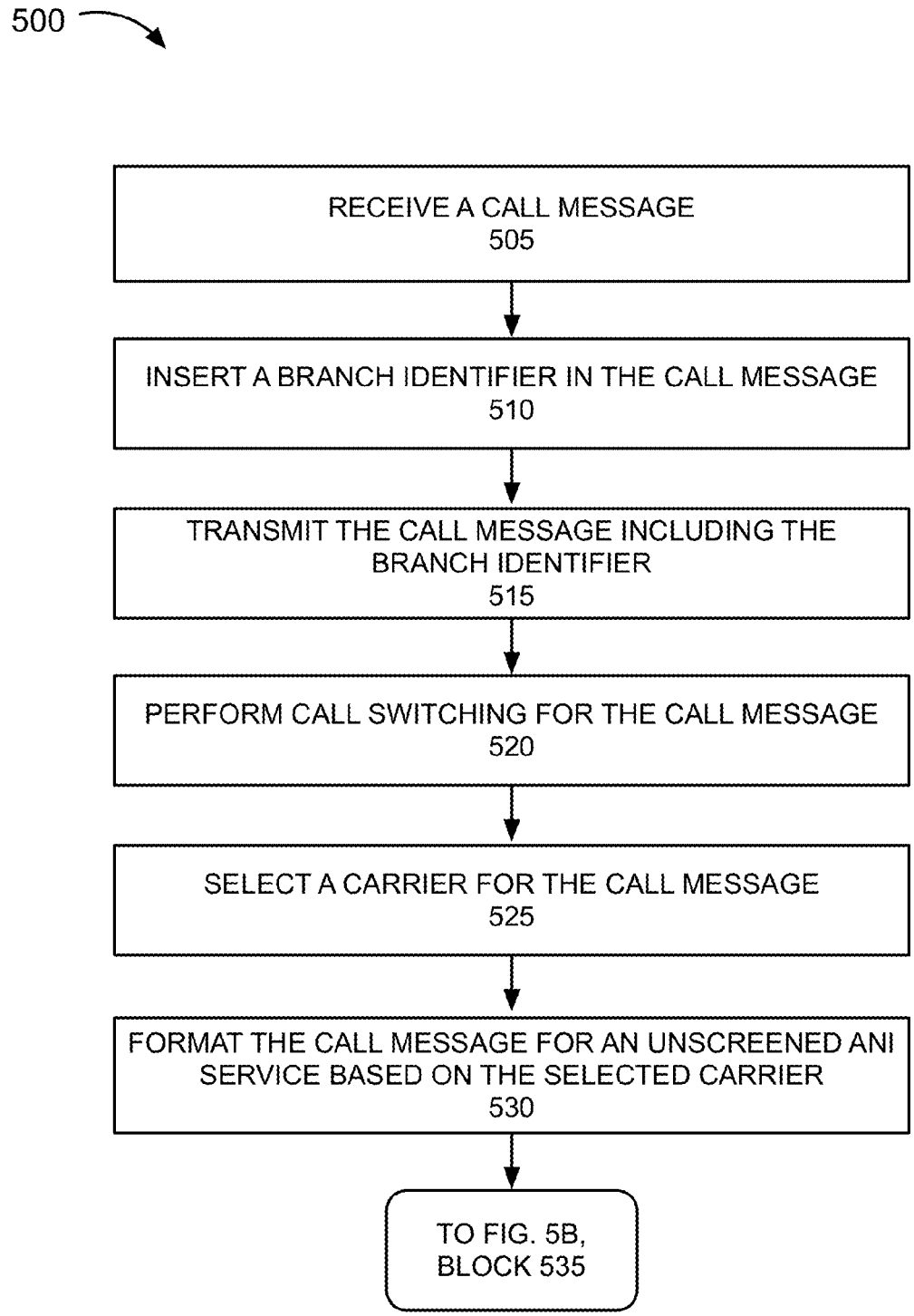
FIGS. 5A and 5B are flow diagrams illustrating an exemplary process for providing unscreened automatic number identification service based on a branch identifier.
Figure 5B:
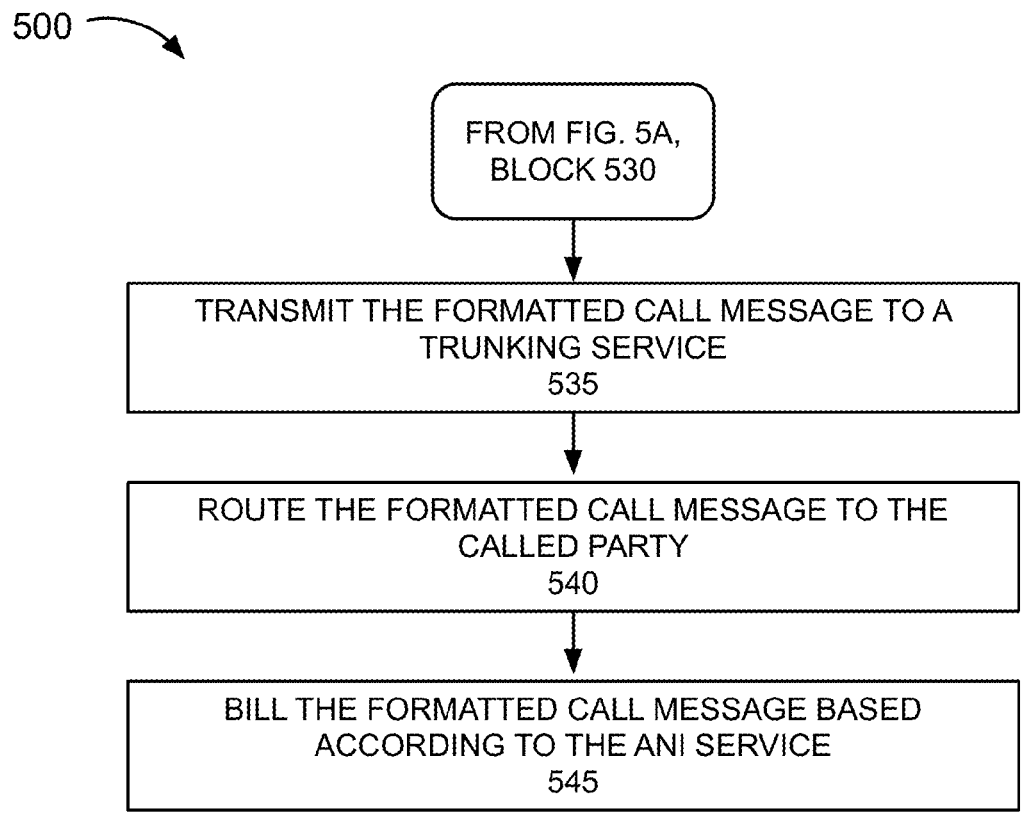

FIGS. 5A and 5B are flow diagrams illustrating an exemplary process for providing unscreened automatic number identification service based on a branch identifier. According to an exemplary embodiment, network device 115 and network device 130 perform steps included in process 500. For example, processor 405 may execute software 415 to perform the steps described.

Referring to FIG. 5A, in block 505, a call message is received. For example, a user places a telephone call via user device 110. Network device 115 receives a call message pertaining to the telephone call.

In block 510, a branch identifier is inserted in the call message. For example, network device 115 adds a branch identifier to the call message. The branch identifier indicates the branch office (e.g., an enterprise branch site) from which the call originated.

In block 515, the call message including the branch identifier is transmitted. For example, network device 115 transmits the call message including the branch identifier to an enterprise's main branch in which PBX services are provided.

In block 520, call switching for the call message including the branch identifier is performed. For example, PBX 135 performs call switching based on the called party number. The call message including the branch identifier may be switched as an outbound call. According to an exemplary implementation, PBX 135 may convert the call message including the branch identifier to an IP-based message (e.g., a SIP invite message, etc.).

In block 525, a carrier for the call message including the branch identifier is selected. According to an exemplary implementation, enterprise 125 may subscribe to multiple carriers. According to such an implementation, network device 130 selects a carrier for completing the call. By way of example, network device 130 selects the carrier based on load balancing. According to other implementations, enterprise 125 may subscribe to a single carrier.

In block 530, the call message is formatted for an unscreened automatic number identification service based on the selected carrier. For example, as previously described, if not already included in the call message, network device 130 may add a header or other type of data/information field to the call message that the selected carrier may use to provide an unscreened automatic number identification service. According to an exemplary implementation, network device 130 may use database 300 to select one or multiple telephone numbers (e.g., a telephone number for billing, a telephone number to serve as a "from" telephone number, etc.).

Referring to FIG. 5B, in block 535, the formatted call message is transmitted to a trunking service. For example, network device 130 transmits the formatted call message to network device 160.

In block 540, the formatted call message is routed to the called party. For example, network device 160 selects a route and a trunk group based on the called party number. The call is routed via a telephone/voice network (e.g., PSTN 175) to the called party (e.g., user of user device 185). According to an exemplary implementation, network device 165 formats the call message for PSTN 175.

In block 545, the formatted call message is billed according to the unscreened automatic number identification service. For example, network device 160 provides billing information to billing device 170 based on information included in the formatted call message. For example, network device 160 may use the telephone number included in a diversion header as billing information.

Although FIGS. 5A and 5B illustrate an exemplary process 500 to provide unscreened automatic number identification service based on a branch identifier, according to other embodiments, process 500 may include additional operations, fewer operations, and/or different operations than those illustrated in FIGS. 5A and 5B and described herein. Additionally, according to other embodiments, PBX 135 or some other network device in a calling path may perform one or more steps of process 500.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A-5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
receiving, by a network device, a message pertaining to a telephone call set-up, wherein the message includes a source telephone number and a destination telephone number;
inserting, by the network device, a branch identifier that indicates an enterprise branch from which the message originated;
transmitting, by the network device, the message including the branch identifier;
receiving, by another network device, the message including the branch identifier;
selecting a carrier to deliver the message including the branch identifier towards a destination of the message; and
formatting the message including the branch identifier based on the selected carrier, wherein the formatting includes:
selecting a telephone number for billing the telephone call based on the branch identifier;
adding the selected telephone number to the message; and
replacing a telephone number extension included in a From field with a telephone number.

2. The method of claim 1, further comprising:
receiving the message including the branch identifier; and
call switching the message including the branch identifier based on the destination telephone number.

3. The method of claim 1, further comprising:
generating billing information based on the selected telephone number.

4. The method of claim 1, wherein the formatting further comprises:
identifying that the message includes a header for providing unscreened automatic number identification.

5. The method of claim 1, wherein the formatting further comprises:
identifying that the message does not include a header for providing unscreened automatic number identification; and
adding a header in response to identifying that the message does not include the header.

6. The method of claim 1, wherein the inserting further comprises:
inserting the branch identifier in a user-to-user information header or a uniform resource identifier.

7. A method comprising:
receiving, by a network device, a message pertaining to a telephone call set-up, wherein the message includes a source telephone number and a destination telephone number;
inserting, by the network device, a branch identifier that indicates an enterprise branch from which the message originated;
transmitting, by the network device, the message including the branch identifier;
receiving, by another network device, the message including the branch identifier;
selecting a carrier to deliver the message including the branch identifier towards a destination of the message; and
formatting the message including the branch identifier based on the selected carrier, wherein the formatting includes:
selecting a telephone number for billing the telephone call based on the branch identifier;

adding the selected telephone number to the message;
identifying that the message does not include a header for providing unscreened automatic number identification; and
adding the header in response to the identifying.

8. The method of claim 7, wherein the formatting further comprises:
replacing a telephone number extension included in a From field with a telephone number based on the branch identifier.

9. The method of claim 7, further comprising:
generating billing information based on the selected telephone number.

10. The method of claim 7, further comprising:
receiving the message including the branch identifier; and
call switching the message including the branch identifier based on the destination telephone number.

11. The method of claim 7, wherein the message includes a Session Initiation Protocol Invite message.

12. The method of claim 7, wherein the source telephone number does not include an area code that is the same as an area code of the destination telephone number, and wherein the selected telephone number includes an area code that is the same as the area code of the destination telephone number.

13. A method comprising:
receiving, by a network device, a message pertaining to a telephone call set-up, wherein the message includes a source telephone number and a destination telephone number;
inserting, by the network device, a branch identifier that indicates an enterprise branch from which the message originated;
transmitting, by the network device, the message including the branch identifier;
receiving, by another network device, the message including the branch identifier;
selecting a carrier to deliver the message including the branch identifier towards a destination of the message; and
formatting the message including the branch identifier based on the selected carrier, wherein the formatting includes:
selecting a telephone number for billing the telephone call based on the branch identifier;
adding the selected telephone number to the message; and
identifying whether the message includes a header for providing unscreened automatic number identification.

14. The method of claim 13, wherein the formatting further comprises:
adding the header in response to identifying that the message does not include the header, wherein the header comprises a Diversion header or a History header.

15. The method of claim 13, wherein the source telephone number is an extension number.

16. The method of claim 13, wherein the branch identifier is a main telephone number of the enterprise branch, and wherein the inserting comprises:
inserting the branch identifier as a Session Initiation Protocol Uniform Resource Identifier or an Extensible Markup Language tag.

17. A non-transitory storage medium storing instructions executable by a computational device to:

receive a message pertaining to a telephone call set-up, wherein the message includes a source telephone number and a destination telephone number;
insert a branch identifier that indicates an enterprise branch from which the message originated;
select a carrier to deliver the message including the branch identifier towards a destination of the message; and
format the message including the branch identifier based on the selected carrier, wherein the instruction to format comprise instructions to:
select a telephone number for billing the telephone call based on the branch identifier;
add the selected telephone number to the message; and
identify whether the message includes a header for providing unscreened automatic number identification.

18. The non-transitory storage medium of claim 17, wherein the instructions to format further comprise instructions to:
add the header in response to an identification that the message does not include the header.

19. The non-transitory storage medium of claim 17, wherein the instructions to format further comprise instructions to:
replace a telephone number extension included in a From field with a telephone number based on the branch identifier.

20. A system comprising:
a communication interface, wherein the communication interface comprises a transmitter and a receiver;
a memory, wherein the memory stores instructions; and
a processor, wherein the processor executes the instructions to:
receive, via the communication interface, a message pertaining to a telephone call set-up, wherein the message includes a source telephone number and a destination telephone number;
insert a branch identifier that indicates an enterprise branch from which the message originated;
select a carrier to deliver the message including the branch identifier towards a destination of the message; and
format the message including the branch identifier based on the selected carrier, wherein, when formatting the message, the processor executes the instructions to:
select a telephone number for billing the telephone call based on the branch identifier;
add the selected telephone number to the message; and
identify whether the message includes a header for providing unscreened automatic number identification.

21. The system of claim 20, wherein, when formatting, the processor further executes the instructions to:
add the header in response to an identification that the message does not include the header; and
replace a telephone number extension included in a From field with a telephone number based on the branch identifier.

22. The system of claim 20, wherein the source telephone number does not include an area code that is the same as an area code of the destination telephone number, and wherein the selected telephone number includes an area code that is the same as the area code of the destination telephone number.

* * * * *